(12) United States Patent
Rossi

(10) Patent No.: US 7,042,436 B2
(45) Date of Patent: May 9, 2006

(54) METHOD TO DYNAMICALLY OPTIMIZE THE POWER EFFICIENCY OF A DISPLAY BACKLIGHTING SYSTEM BASED ON THE OUTPUT LOAD

(75) Inventor: Thomas M. Rossi, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 333 days.

(21) Appl. No.: 10/458,410

(22) Filed: Jun. 9, 2003

(65) Prior Publication Data

US 2004/0246247 A1 Dec. 9, 2004

(51) Int. Cl.
G09G 3/36 (2006.01)
G09G 5/00 (2006.01)

(52) U.S. Cl. .................................. 345/102; 345/212
(58) Field of Classification Search ............... 345/102, 345/211–212; 349/61, 68
See application file for complete search history.

(56) References Cited

U.S. PATENT DOCUMENTS

| | | | | |
|---|---|---|---|---|
| 5,315,695 A | * | 5/1994 | Saito et al. | 345/102 |
| 5,818,172 A | * | 10/1998 | Lee | 315/86 |
| 5,854,617 A | * | 12/1998 | Lee et al. | 345/102 |
| 6,151,008 A | * | 11/2000 | Zhang | 345/102 |
| 6,496,236 B1 | * | 12/2002 | Cole et al. | 349/61 |
| 6,804,129 B1 | * | 10/2004 | Lin | 363/98 |
| 2001/0013854 A1 | * | 8/2001 | Ogoro | 345/102 |
| 2002/0195954 A1 | * | 12/2002 | Kim | 315/149 |
| 2003/0016204 A1 | * | 1/2003 | Lee | 345/102 |
| 2003/0210221 A1 | * | 11/2003 | Aleksic | 345/102 |

* cited by examiner

*Primary Examiner*—Sumati Lefkowitz
*Assistant Examiner*—Rodney Amadiz
(74) *Attorney, Agent, or Firm*—Blakely, Sokoloff, Taylor & Zafman LLP

(57) ABSTRACT

A computer system that dynamically optimizes the power efficiency of a display backlighting system based on the current load is described. Specifically, the computer system may be optimized to operate in a battery mode or an AC line driven mode.

24 Claims, 5 Drawing Sheets

METHOD TO DYNAMICALLY OPTIMIZE THE POWER EFFICIENCY OF A DISPLAY BACKLIGHTING SYSTEM BASED ON THE OUTPUT LOAD

FIELD OF THE INVENTION

The present invention pertains to the field of computer design. More particularly, the present invention relates to a method for optimizing power in a computer having a liquid crystal display.

BACKGROUND OF THE INVENTION

A liquid crystal display (LCD) is one means for providing an interface between a computer and a computer user. For instance, notebook or laptop computer systems typically have a LCD panel. Most computer LCD panels are illuminated with built-in fluorescent tubes. The tubes may be placed above, beside, or behind the LCD. A cold cathode fluorescent lamp (CCFL) is a common fluorescent tube for providing a uniform white light inside a LCD panel. The LCD often uses a diffusion layer to redirect and scatter the CCFL light evenly. Because the CCFL operates at high AC voltages, the CCFL typically requires a power converter circuit to convert an input DC voltage to an AC voltage.

FIG. 1 depicts a diagram of a backlight LCD system. Inverter 10 receives a DC voltage as input and generates an AC voltage. CCFL 20 is coupled to inverter 10 and uses the AC voltage generated by inverter 10 to generate white light.

The output load of the inverter 10 is set to a level of energy that the inverter 10 must generate in order to adequately power the CCFL 20 to satisfy the system display's brightness setting. The output load may be defined by intensity depending on how much current the CCFL 20 requires for operation. For example, the computer system may operate in a low intensity state when the computer display is set to a non-visible brightness level, a medium intensity state when powered by a battery, and high intensity state when powered by an AC line power outlet. The computer is considered to be in a "battery mode" when the system is powered only by a battery. The computer is considered to be in "AC mode" when the system is powered by an AC line power outlet.

Inverter efficiency is the ratio of the generated inverter output electric power divided by the input electric power. Inverters of a computer system are typically designed to have optimal power conversion efficiency when operated near the maximum output load range. Thus, inverters are often most efficient when the CCFL is in a high intensity light output state.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In an electronic system, the brightness setting of the system when powered by an AC source may be different than the brightness setting of the system when powered by a battery. Inverters are typically designed to generate the maximum efficiency near the maximum load that the inverters must drive. The inverter maximum load is achieved during high intensity light output from the backlight. Thus, in a system powered by only a battery, the system is often operating at less than maximum efficiency. Improving the load efficiency during medium intensity would help to improve the average battery operating time of the system. The electronic system may be a notebook computer, a cell phone, a desktop monitor, or a digital television.

Figure 1:
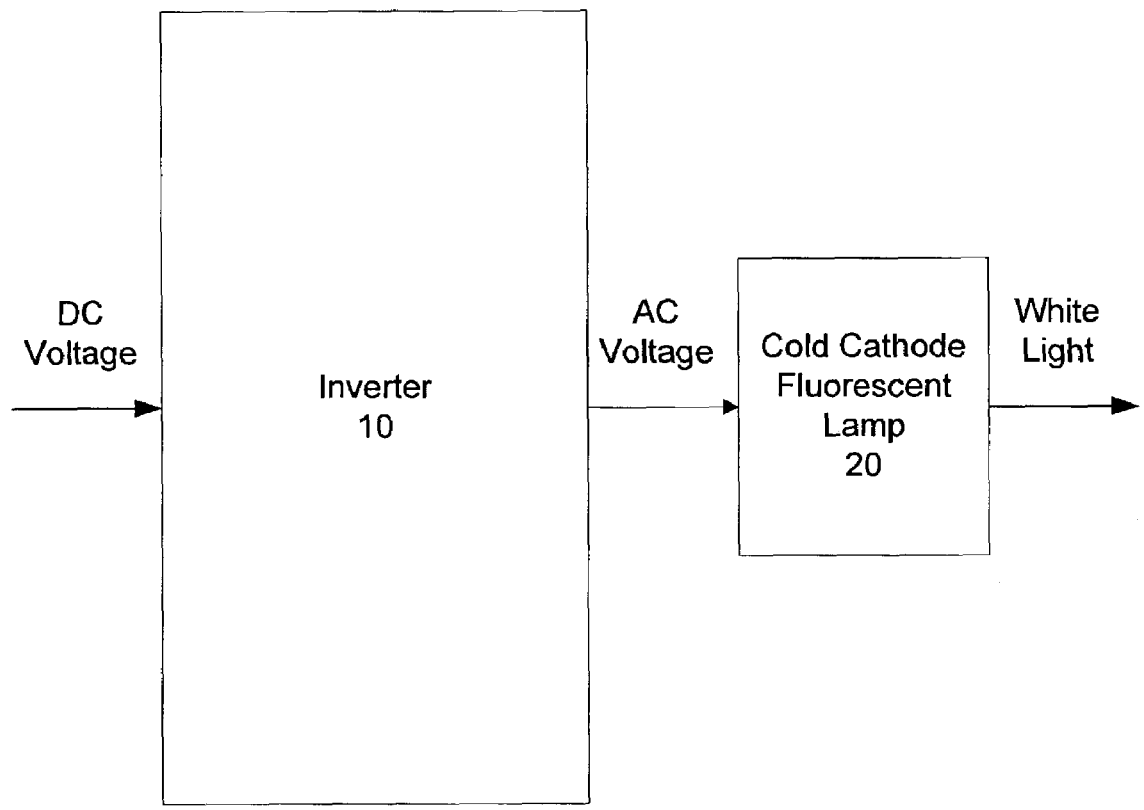
FIG. 1 is a prior art backlit LCD system.
Figure 2:
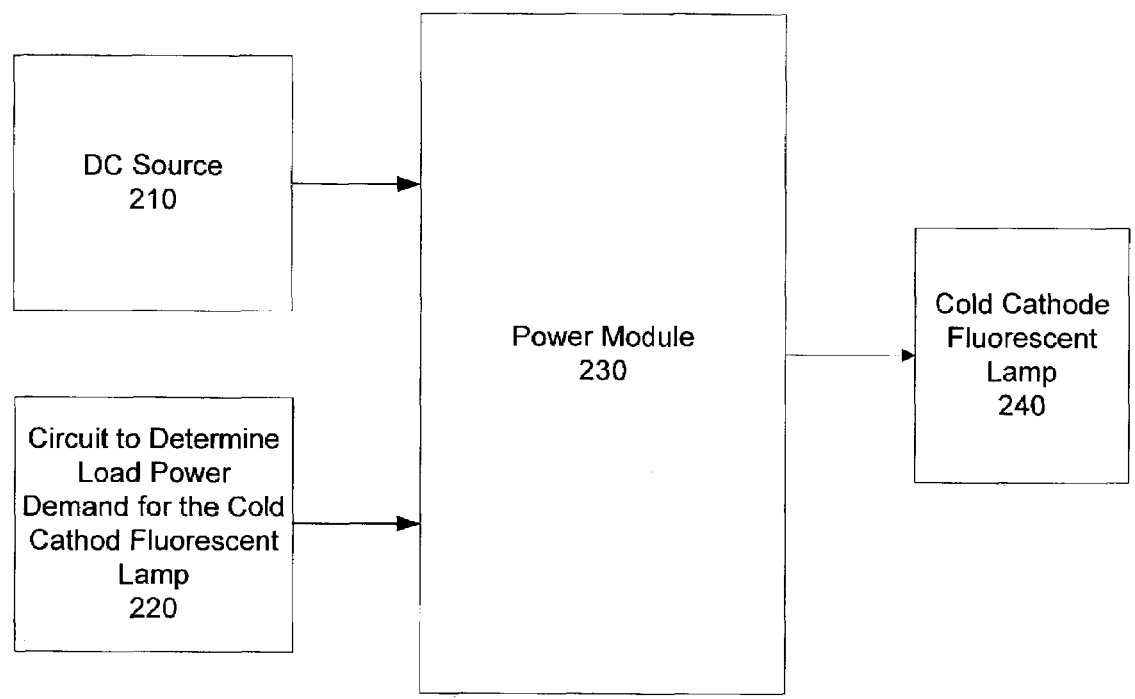
FIG. 2 is an embodiment of a system that optimizes the load efficiency.

For one embodiment of the invention, FIG. 2 depicts a backlight power module 230 that improves the load efficiency when the system is operated in a medium intensity state. Power module 230 is coupled to a DC source 210, a CCFL 240, and a circuit 220 to determine output load or load power demand for the CCFL 240. The circuit 220 may comprise combinational logic with ordinary transistors. The power module 230 may comprise an inverter to generate an AC signal to power the CCFL 240.

When the system is in battery mode, DC source 210 may be a battery. The battery supplies a DC voltage to the power module 230. Alternatively, if the system is powered by an AC power outlet, the DC source may be a downstream regulated DC source derived from the AC line power. The circuit 220 provides a second input to inverter 230 and determines the load power demand of the CCFL 240.

For this embodiment of the invention, circuit 220 senses whether an AC power source is charging the battery in the system. If the circuit 220 determines that the system is running off of an AC source rather than the battery alone, the circuit 220 communicates to the power module 230 that the system is operating in a high intensity state. The power module 230 then generates an AC signal to drive the CCFL 240 based upon a high intensity load.

Otherwise, if the circuit 220 determines that the system is running in a medium intensity state, the power module 230 generates an AC signal to drive the CCFL 240 based upon a medium intensity load. Power module 230 may comprise an inverter to generate the AC signal. One embodiment of power module 230 will be further described below in FIG. 5.

For another embodiment of the invention, the circuit 220 for determining the required CCFL 240 load is performed through system software instead of hardware. Computer systems often have a range of brightness settings that may be controlled using an operating system (OS) sensor control. For example, the OS sensor control may be used to interpret the brightness setting made through a potentiometer, a keyboard entry, or an analog brightness adjustor. The system software then determines the range of brightness settings to transmit to the power module 230. The power module 230 takes the brightness setting and generates an AC signal to enable the CCFL 240 to create a certain amount of white light.

In AC mode, the display panel may operate at a higher brightness setting to improve the visibility of the image for the user. However, if the system detects that the AC power source has been withdrawn, the system may limit the upper brightness setting. As a result of the system being placed in battery mode, the load capacity may shift from high intensity to medium intensity. The circuit 220 detects and communicates the mode change to the power module 230, which then makes the appropriate adjustment to improve load efficiency.

For yet another embodiment of the invention, the circuit 220 may incorporate an ambient light sensor that senses the available light in which the computer system is operating. The ambient light sensor may be located within the body of a notebook computer or external to a computer system. Depending on the amount of light detected by the backlight power module 230 through the environment, the circuit 220 may switch the power module 230 to a different brightness level to reduce power consumption.

For yet another embodiment of the invention, the power module 230 may auto-detect the load power demand for the CCFL. The load power demand for the CCFL may depend upon the system display's brightness setting.

For yet another embodiment of the invention, power module 230 may comprise an input that allows the power module 230 to override the brightness setting as provided by circuit 220. In this embodiment of the invention, the user may determine whether to set the system to maximize efficiency in medium intensity or high intensity regardless of whether the system is actually in battery mode or AC mode.

Figure 3:
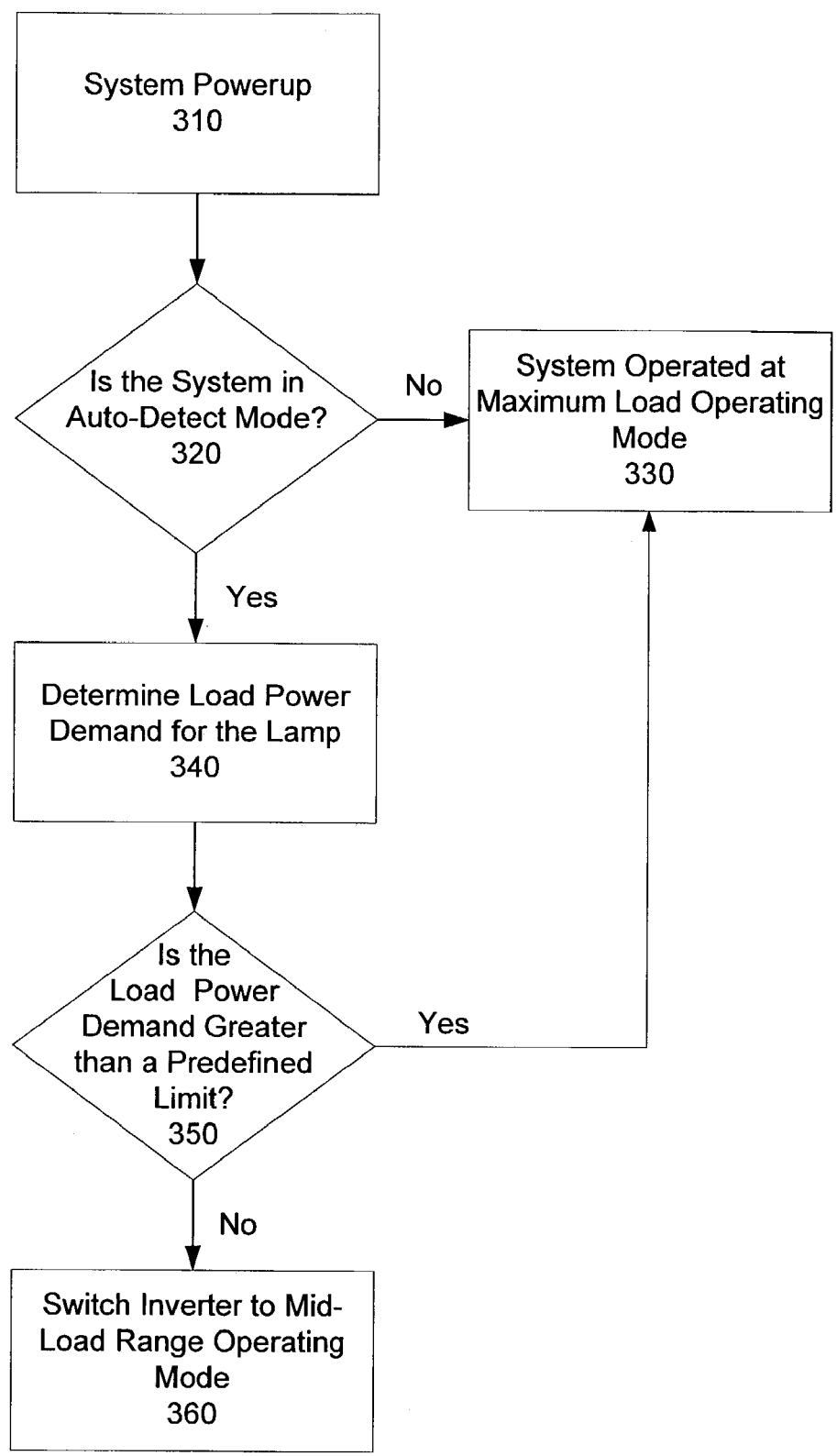
FIG. 3 is an embodiment of a flowchart for setting the operating mode.

A flowchart that describes the operations of system that maximizes the load efficiency based on the current load is depicted in FIG. 3. After system powerup in operation 310, operation 320 determines whether the system is enabled to auto-detect the load power demand of the CCFL 240. For example, if the user overrides the power module 230, the auto-detect is no longer enabled. In this embodiment of the invention, if the auto-detect mode is not enabled, the system is operated in the maximum load operating mode or AC mode in operation 330.

However, if the auto-detect mode is enabled, the circuit 220 determines the load power demand for the lamp in operation 340. The system then determines in operation 350 whether the load power demand detected is greater than a specified limit. If the load demand is greater than this predefined limit, the system is placed in the maximum load operating mode or AC mode in operation 330. Otherwise, if the load demand is less than the predefined limit, the system is placed in the mid-load range operating mode or battery mode in operation 360. The brightness level of the system display in the mid-range operating mode is reduced compared to the brightness setting of a system in the maximum load operating mode. If at any time, the circuit 220 detects a change in load power demand, the circuit 220 may switch the power module 230 to a different operating mode.

Figure 4:
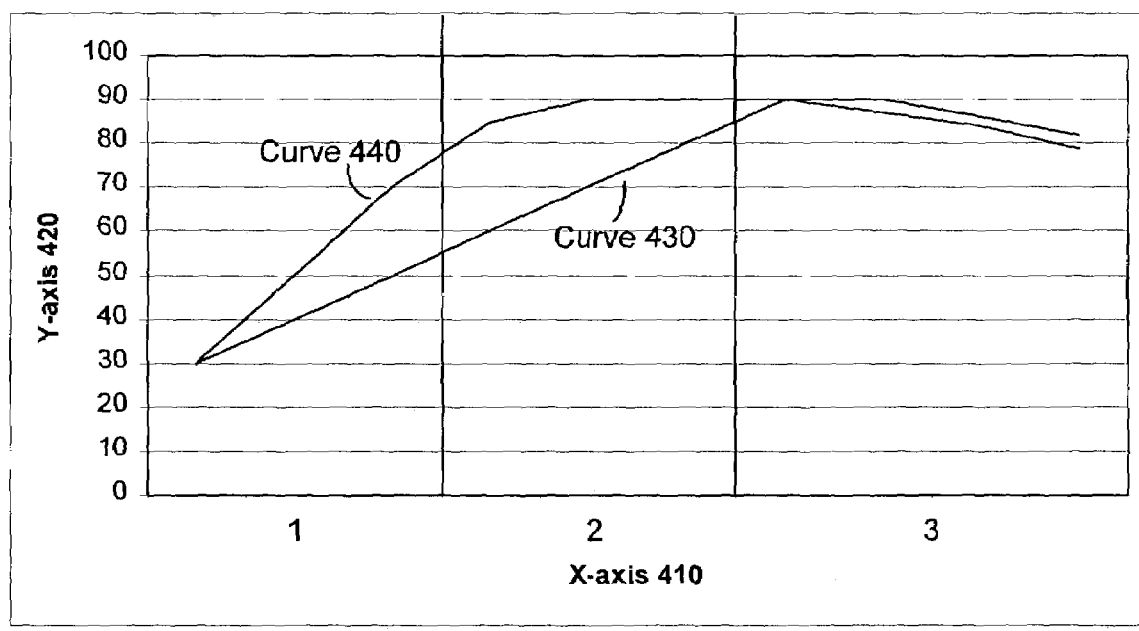
FIG. 4 is a graph of the load efficiency of an embodiment of a mobile display backlighting system.

FIG. 4 depicts a graph of one embodiment of the available power module 230 setting options. X-axis 410 represents normalized power regions and y-axis 420 is the corresponding load efficiency. Curve 430 is a load efficiency curve of a power module that is set to AC mode and therefore maximizes the load efficiency for a high intensity state. Curve 440 is a load efficiency curve of the power module that is set to battery mode to maximize the load efficiency for a medium intensity state.

X-axis 410 is a function of time. Voltage and current measurements of inverters are taken over a period of time because the values vary over time. As a result, normalized power values depend upon voltage and current measurements over a given period of time. For the embodiment of the invention represented in FIG. 4, region 1 of x-axis 410 constitutes a low intensity state; region 2 constitutes a medium intensity state; and region 3 constitutes a high intensity state.

Curve 440 offers an approximately 10–40% improvement over curve 430 in load efficiency during medium intensity. However, the load efficiency of curve 440 may have a depreciated load efficiency with respect to curve 430 during high intensity.

Power module 230 may have an inverter or a plurality of inverters that are capable of generating output power signals that have a load efficiency of curve 430 and curve 440. Power module 230 may be switched to either curve depending on the detected load power demand of circuit 220. If the load power demand is greater than a predefined limit, then the power module may be set for operation based upon curve 430. On the other hand, if the load power demand is less than a predefined limit, then the power module may be set for operation based upon curve 440. Switching the power module 230 to optimize the load efficiency may allow a computer system powered by a battery to have a longer operating time because power consumption is reduced.

For another embodiment of the invention, an option may be available to further optimize the load efficiency during a low intensity state. The system may offer a power module setting to optimize the low intensity load efficiency.

Figure 5:
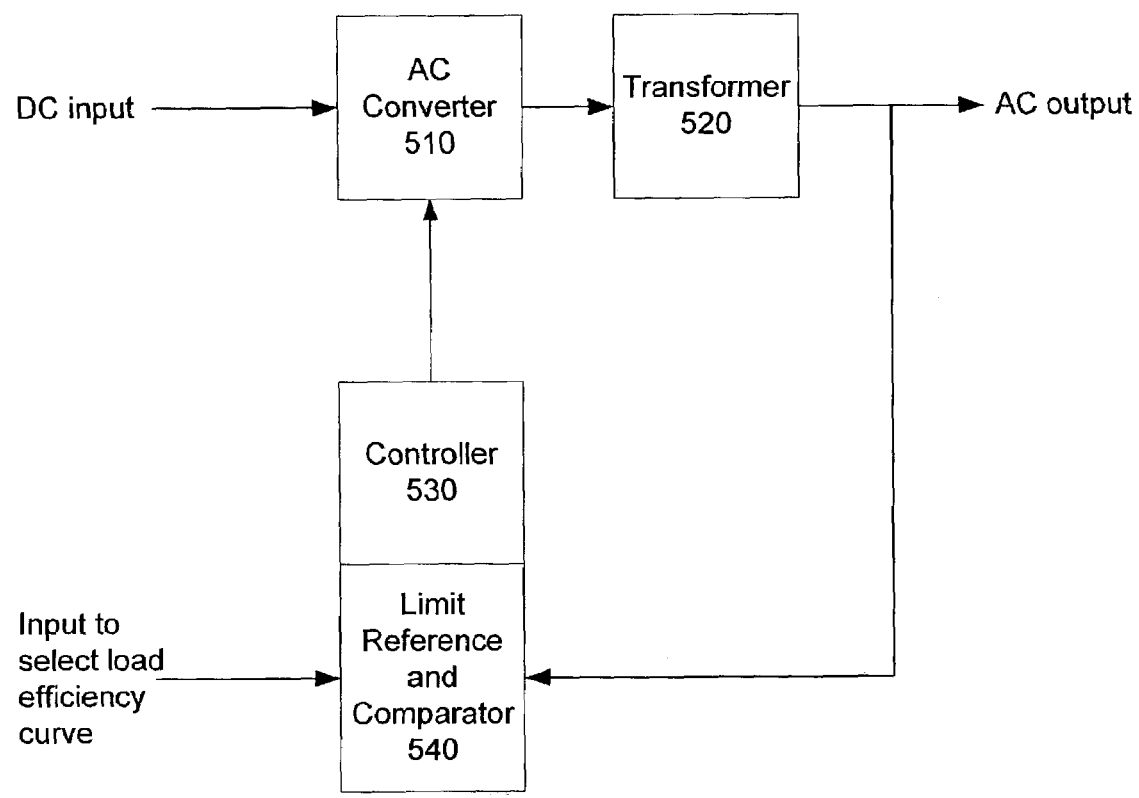
FIG. 5 is an embodiment of a backlight power module.

FIG. 5 depicts an embodiment of a power module 230. The power module 230 comprises an AC converter 510 coupled to a transformer 520 and a controller 530. The transformer 520 and the controller 530 are coupled to the limit reference and comparator 540. The AC converter 510 receives a DC voltage input from a DC source such as a battery. The AC converter 510 may convert the DC input into an AC output by switching the DC power source across an inductor.

The controller 530 turns the AC converter 510 on or off depending on the feedback the controller 530 receives from the output of the transformer 520 via the limit reference and comparator 540. The signal from the controller 530 to the AC converter 510 may be analog or digital. If the AC converter 510 is enabled by the controller 530, the AC converter provides a low voltage AC signal to the transformer 520. The transformer 520 then generates a high voltage output signal to power the CCFL 240. The controller 530 compares the transformer 520 output signal with an internal limit reference or references through the limit reference and comparator 540. The controller 530 is responsible for managing the energy sent to the transformer 520 by the AC converter 510.

The CCFL 240 acts as an open circuit, drawing no current, before the CCFL 240 starts generating light. Voltage of a sufficient level may be applied by the transformer 520 to ignite the CCFL 240. Once the light emission begins, the lamp no longer appears as an open circuit, but as a relatively low impedance circuit. When the output reaches a certain voltage level, the AC converter 510 is reduced or turned off turned off to prevent failure of the CCFL 240, to limit the lamp's power consumption, and to reduce light emission levels.

The limit reference and comparator 540 may detect the point at which the CCFL 240 ignition occurs by monitoring the current flow from the transformer 520. The limit reference and comparator 540 may measure the transformer 520 power applied to the CCFL 240 and serve as a reference for the controller 530.

The limit reference and comparator 540 also receives an input to select an appropriate load efficiency curve. This input may be a function of the brightness setting of the system display. Depending on the load efficiency curve selected, the AC converter 510 may be turned on by controller 530 and used to pass an AC voltage source to the transformer 520 to optimize the load efficiency of a low intensity, a medium intensity, or a high intensity state.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. An electronic system comprising: a power source; and a backlight power module coupled to the power source that receives a DC signal form the battery and outputs an AC signal, wherein the backlight power module selects an operating mode based on a corresponding optimized load efficiency, and wherein the operating mode comprises a battery operating mode and an AC operating mode.

2. The electronic system of claim 1, further comprising: a cold cathode fluorescent lamp (CFFL) coupled to the backlight power module, wherein the backlight power module auto-detects a load power demand of the CCFL and selects the operating mode based on the detected load power demand.

3. The electronic system of claim 2, further comprising: a liquid crystal display (LCD) coupled to the CCFL, wherein the CCFL provides a white light inside the LCD panel, wherein the load power demand of the CCFL is a function of a brightness setting of the electronic system.

4. The electronic system of claim 1, wherein the backlight power module accepts a control signal input from an operating system sensor to switch to a specific operating mode.

5. The electronic system of claim 1, wherein the backlight power module is set to a first load efficiency curve if the electronic system is powered by the battery.

6. The electronic system of claim 5, wherein the backlight power module is set to a second load efficiency curve if the electronic system is powered by an AC power outlet.

7. The electronic system of claim 6, wherein a circuit detects a load power demand and sets the backlight power module to the first load efficiency curve if the load power demand is less than a load power threshold.

8. The electronic system of claim 7, wherein the circuit sets the backlight power module to the second load efficiency curve if the load power demand is greater than a load power threshold.

9. The electronic system of claim 1, wherein the backlight power module comprises an AC converter to convert the DC signal received from the power source to the AC signal, wherein the AC converter is optimized for loads corresponding to the system being powered by an AC line power outlet.

10. The electronic system of claim 9, wherein the AC converter is optimized for loads corresponding to the system being powered by the battery.

11. A mobile computer, comprising: means for detecting load power demand of a backlight system; and means for selecting an operating mode based on a corresponding optimized load efficiency, said efficiency based on the load power demand detected.

12. The mobile computer of claim 11, further comprising: means for a user to override the load efficiency.

13. The mobile computer of claim 11, further comprising: means for dynamically optimizing the load efficiency of the backlight system if the load power demand is modified.

14. A method, comprising:
powering up a computer system having a cold cathode fluorescent lamp (CCFL);
detecting if the computer system is powered by a battery or an AC power outlet;
determining the load power demand of the CCFL; and
setting an operating mode of a power module with a corresponding optimized load efficiency based on the load power demand.

15. The method of claim 14, wherein setting the operating mode with a first load efficiency curve if the system is powered by the battery.

16. The method of claim 15, wherein setting the operating mode with a second load efficiency curve if the system is powered by the AC power outlet.

17. The method of claim 15, further comprising:
overriding the selected first load efficiency curve if a user override signal is received by the power module.

18. The method of claim 14, wherein the computer system is a notebook computer.

19. An apparatus, comprising:
a first circuit that generates a first AC output signal from a DC input signal, wherein the output efficiency of the first circuit is defined by a first efficiency curve;
a second circuit coupled to the first circuit, wherein the second circuit generates a second AC output signal from the DC input signal; and
a switch coupled to the first circuit and the second circuit, wherein the switch selects the first AC output signal to power a cold cathode fluorescent lamp (CCFL) of a computer liquid crystal display (LCD) if the computer is in a battery mode.

20. The apparatus of claim 19, wherein the switch selects the second AC output signal to power the CCFL of the LCD if the computer is in an AC mode.

21. The apparatus of claim 20, wherein the first efficiency curve and the second efficiency curve comprise a first range, a second range, and a third range, wherein the first range represents the output efficiency of the first and the second circuits when the computer LCD has a brightness setting that is non-visible, wherein the second range represents the output efficiency of the first and the second circuits when the computer is in the battery mode, wherein the third range represents the output efficiency of the first and the second circuits when the computer is in the AC mode.

22. The apparatus of claim 21, wherein the output efficiency of the first circuit is greater than the output efficiency of the second circuit in the second range.

23. The apparatus of claim 21, wherein the output efficiency of the first circuit is approximately equal to the output efficiency of the second circuit in the third range.

24. The apparatus of claim 23, wherein system software of the computer detects whether the computer is in the battery mode.

* * * * *